R. M. CAUFFMAN & W. BEST.
BOTTLE STOPPER.
APPLICATION FILED FEB. 24, 1908.

905,286.

Patented Dec. 1, 1908.

Witnesses:
George Oltsch
G. M. Cole.

Robert M. Cauffman
Wellington Best
Inventors
By
Attny.

UNITED STATES PATENT OFFICE.

ROBERT M. CAUFFMAN AND WELLINGTON BEST, OF CENTERVILLE, MICHIGAN.

BOTTLE-STOPPER.

No. 905,286.  Specification of Letters Patent.  Patented Dec. 1, 1908.

Application filed February 24, 1908. Serial No. 417,488.

*To all whom it may concern:*

Be it known that we, ROBERT M. CAUFFMAN and WELLINGTON BEST, citizens of the United States, residing at Centerville, in the county of St. Joseph and State of Michigan, have invented certain new and useful Improvements in Bottle-Stoppers, of which the following is a specification.

This invention relates to milk jar closures. Dairymen, milk dealers and others are aware that milk will not sour as quickly in an open vessel as in a hermetically sealed container, and one of the objects of our invention is to improve existing conditions manifest in the handling of milk hermetically sealed in bottles or jars in which the milk is served to consumers.

Another object of the invention resides in the provision of a closure of the nature stated embodying such characteristics that it will permit of the ingress of air into the container to commingle with the milk but prevent the admission of insects or other impurities.

A still further object is to provide a closure composed of fibrous material and an impervious material, the latter adhering to portions of the former and not to other portions thereof so that the impervious material will not hinder the filtering of the air through the closure.

With the above and other objects in view the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

Figure 1:
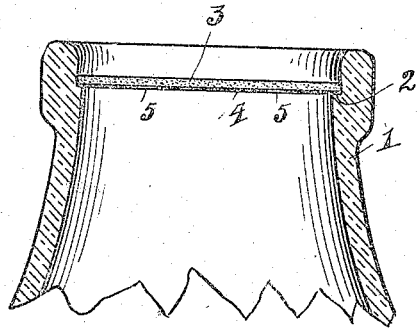
Figure 2:
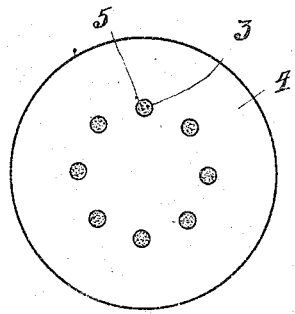

In the drawings—Figure 1 is a sectional view of a portion of a bottle or jar, illustrating the application of our invention. Fig. 2 is a plan view of the closure.

Referring now to the accompanying drawings to explain the characteristics of our invention in detail, the reference character 1 indicates the neck portion of a bottle or jar provided with an annular internal shoulder 2 for the support of our improved closure. The bottle or jar is of any well known construction, and our closure is particularly adapted to the bottles and jars now in common use.

The closure is preferably composed of a fibrous disk 3 and an impervious disk 4, the former being of any suitable character or fabric and the latter being of any suitable impervious material, preferably paraffin. Thus the fibrous disk is coated on one side with an impervious substance, and in use, the coated side of the disk is preferably exposed to contact by the milk because it will not absorb the milk splashed against it in the handling of the jars or bottles. The coating has the further function of stiffening the fibrous material.

The fibrous material, if used alone, would permit of the ingress of air into the jar and also prevent the ingress of insects or other foreign matter likely to contaminate the milk; and in order that the paraffin disk coating will not interfere with the admission of air into the jar through the fibrous material, we prefer to leave portions of the fibrous disk uncoated, thereby providing openings 5 in the impervious coating to permit the air to filter through the fibrous material and the openings 5, and enter the container to preserve the milk.

In the manufacture of our improved closure the machine for making the same may have a die constructed to cut the disks out of fibrous sheets and coat then in the same operation.

What is claimed is—

1. A jar closure comprising a disk and an impervious coating having openings therein.

2. A jar closure comprising a fibrous disk and a paraffin coating on portions of one side thereof, the remaining portions of said side of the fibrous disk being uncoated.

3. A jar closure comprising a disk and an impervious coating on one side of the disk having openings therein.

In testimony whereof we affix our signatures, in presence of two witnesses.

ROBERT M. CAUFFMAN.
WELLINGTON BEST.

Witnesses:
GEORGE OLTSCH,
G. M. COLE.